(12) United States Patent
Sawyers-Abbott

(10) Patent No.: US 9,925,732 B2
(45) Date of Patent: Mar. 27, 2018

(54) METALLIC-COATED POLYMER THRUST REVERSER CASCADES

(71) Applicant: UNITED TECHNOLOGIES CORPORATION, Farmington, CT (US)

(72) Inventor: Nigel David Sawyers-Abbott, South Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 245 days.

(21) Appl. No.: 14/459,930

(22) Filed: Aug. 14, 2014

(65) Prior Publication Data

US 2015/0285184 A1   Oct. 8, 2015

Related U.S. Application Data

(60) Provisional application No. 61/919,203, filed on Dec. 20, 2013.

(51) Int. Cl.
| | |
|---|---|
| *B29D 99/00* | (2010.01) |
| *F02K 1/72* | (2006.01) |
| *B29L 31/08* | (2006.01) |

(52) U.S. Cl.
CPC ............ *B29D 99/0025* (2013.01); *F02K 1/72* (2013.01); *B29L 2031/082* (2013.01); *F05D 2230/30* (2013.01); *F05D 2230/90* (2013.01); *F05D 2240/129* (2013.01); *F05D 2300/143* (2013.01); *F05D 2300/43* (2013.01); *F05D 2300/433* (2013.01); *F05D 2300/611* (2013.01); *Y02T 50/672* (2013.01); *Y10T 29/49323* (2015.01)

(58) Field of Classification Search
CPC combination set(s) only.
See application file for complete search history.

(56) References Cited

U.S. PATENT DOCUMENTS

| | | | |
|---|---|---|---|
| 8,745,966 B2 * | 6/2014 | Metezeau | F02K 1/72 60/226.2 |
| 9,387,933 B2 * | 7/2016 | James | F02K 1/72 |
| 9,427,834 B2 * | 8/2016 | Fremont | B29B 11/16 |
| 2013/0101406 A1 | 4/2013 | Kweder et al. | |
| 2014/0193270 A1 * | 7/2014 | Plunkett | B29D 99/0025 416/241 R |

* cited by examiner

*Primary Examiner* — David Walczak
(74) *Attorney, Agent, or Firm* — Cantor Colburn LLP

(57) ABSTRACT

A thrust reverser cascade for a gas turbine engine is disclosed. The thrust reverser cascade may comprise a plurality of turning vanes. One or more of the turning vanes may comprise a core formed from a polymer and a metallic coating applied to at least a portion of an outer surface of the core. The metallic coating may comprise nickel or a nickel alloy.

18 Claims, 4 Drawing Sheets

METALLIC-COATED POLYMER THRUST REVERSER CASCADES

CROSS-REFERENCE TO RELATED APPLICATION

This Application is a non-provisional patent application claiming priority under 35 U.S.C. § 119(e) to U.S. Provisional Patent Application Ser. No. 61/919,203 filed on Dec. 20, 2013.

FIELD OF DISCLOSURE

The present disclosure generally relates to thrust reversers cascades in gas turbine engines, and more specifically, relates to thrust reverser cascades having one or more turning vanes formed from a metallic-coated polymer.

BACKGROUND

Gas turbine engines, such as those used to provide thrust for an aircraft, typically include a fan section and a core engine located downstream of the fan section. A nacelle may surround the fan section and the core engine and define an annular bypass duct between the nacelle and the core engine. During operation of an aircraft, air may be drawn into the gas turbine engine and accelerated by the fan section, and a fraction of the indrawn air may be routed through a path defined by the core engine where it may be compressed, combusted with fuel, and exhausted through an exhaust nozzle to provide primary forward thrust. The remaining indrawn air may pass through the bypass duct and exit through a nozzle to provide secondary forward thrust.

After touch down, a thrust reverser located at a downstream portion of the nacelle may be activated to provide reverse thrust which counteracts the forward thrust and assists in slowing down the aircraft. In general, the thrust reverser may consist of a translating sleeve, a plurality of blocker doors, and a plurality of thrust reverser cascades. When the thrust reverser is activated, the translating sleeve may slide axially downstream to a deployed position to expose the thrust reverser cascades, while the blocker doors may swing to a deployed position in which they may at least partially block airflow through the bypass duct, causing the air to be diverted through turning vanes of the thrust reverser cascades. The turning vanes of the thrust reverser cascades may turn the diverted airflow and generate a reverse thrust which counteracts the forward thrust.

Current technologies for manufacturing turning vanes of thrust reverser cascades may use composite materials which are fabricated by a hand lay-up process. For example, U.S. Patent Application Number 2013/0101406 describes thrust reverser cascades formed from compression molded composite materials composed of resin and fiber reinforcement. While effective, thrust reverser cascades fabricated by a hand lay-up process may be relatively expensive to manufacture and they may have limited shape complexity. Older manufacturing technologies for thrust reverser cascades have used aluminum-based turning vanes, but these types of vanes may not trade well from a weight perspective with other types of turning vanes. In addition, turning vanes with more flexible shapes may be desirable as they may provide increased reverse thrust within a given thrust reverser cascade length. As fan duct aerolines are often defined by the necessary thrust reverser cascade length required to achieve a specific reverse thrust, such reductions in in thrust reverser cascade lengths could lead to advantageous reductions in fan duct losses and external drag.

Clearly, there is a need for more cost-effective thrust reverser cascade constructions which provide more flexible turning vane shapes.

SUMMARY

In accordance with one aspect of the present disclosure, a thrust reverser cascade for a gas turbine engine is disclosed. The thrust reverser cascade may comprise a plurality of turning vanes. At least one of the plurality of turning vanes may comprise a core formed from at least one polymer and at least one metallic coating applied to at least a portion of an outer surface of the core.

In another refinement, the at least one metallic coating may comprise nickel.

In another refinement, the at least one metallic coating may be formed from a metallic material selected from the group consisting of nickel and nickel alloys.

In another refinement, the at least one metallic coating may be formed from a metallic material selected from the group consisting of nickel, nickel alloys, copper, silver, iron, gold, palladium, rhodium, chromium, zinc, tin, cadmium, and combinations thereof.

In another refinement, the at least one polymer may be a thermoplastic material selected from the group consisting of polyetherimide, polyether ether ketone, polyether ketone ketone, polysulfone, polyamide, polyphenylene sulfide, polyester, polyimide, and combinations thereof.

In another refinement, the at least one polymer may be a thermoset material selected from the group consisting of polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones, and combinations thereof.

In another refinement, the core may comprise at least one reinforcing material selected from the group consisting of carbon fibers, glass fibers, aramid fibers, metal fibers, and combinations thereof.

In another refinement, the at least one metallic coating may be applied to the outer surface of the core by a method selected from the group consisting of physical vapor electroplating, electroless deposition, and electroforming.

In another refinement, the thrust reverser cascade may be incorporated in a thrust reverser in a nacelle of the gas turbine engine. The thrust reverser may comprise a translating sleeve and at least one actuator capable of actuating the movement of the translating sleeve between a stowed position and a deployed position.

In accordance with another aspect of the present disclosure, a gas turbine engine is disclosed. The gas turbine engine may comprise a fan section and a core engine located downstream of the fan section. The core engine may comprise a compressor section, a combustor located downstream of the compressor section, and a turbine section located downstream of the combustor. The gas turbine engine may further comprise a nacelle surrounding the fan section and the core engine and defining a bypass duct between the nacelle and the core engine. The gas turbine engine may further comprise a thrust reverser disposed in the nacelle and the thrust reverser may comprise at least one blocker door, a translating sleeve, at least one actuator capable of actuating the movement of the at least one blocker door and the translating sleeve between a stowed position and a deployed position, and at least one thrust reverser cascade comprising a plurality of turning vanes. At least one of the plurality of turning vanes may comprise a core formed from at least one polymer, and at least one metallic coating applied to at least a portion of an outer surface of the core.

In another refinement, the at least one metallic coating may comprise nickel.

In another refinement, the at least one metallic coating may be formed from a metallic material selected from the group consisting of nickel, nickel alloys, copper, silver, iron, gold, palladium, rhodium, chromium, zinc, tin, cadmium, and combinations thereof.

In another refinement, the at least one polymer may be a thermoplastic material selected from the group consisting of polyetherimide, polyether ether ketone, polyether ketone ketone, polysulfone, polyamide, polyphenylene sulfide, polyester, polyimide, and combinations thereof.

In another refinement, the at least one polymer may be a thermoset material selected from the group consisting of polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones, and combinations thereof.

In another refinement, the core may further comprise at least one reinforcing material selected from the group consisting of carbon fibers, glass fibers, aramid fibers, metal fibers, and combinations thereof.

In another refinement, the at least one metallic coating may be applied to the outer surface of the core by a method selected from the group consisting of electroplating, electroless deposition, and electroforming In accordance with another aspect of the present disclosure, a method for fabricating a thrust reverser cascade for a gas turbine engine is disclosed. The method may comprise: 1) forming a core in a shape of a turning vane from at least one polymer, 2) applying a metallic coating to an outer surface of the core to provide a metallic-coated polymeric turning vane, and 3) assembling the thrust reverser cascade from a plurality of turning vanes, at least one of the plurality of turning vanes being the metallic-coated polymeric turning vane.

In another refinement, forming the polymer in the shape of the turning vane may be performed using a method selected from the group consisting of injection molding, compression molding, blow molding, additive manufacturing, and composite layup.

In another refinement, the method may further comprise activating the outer surface with a catalyst layer followed by metallizing the outer surface with a conductive layer, prior to applying the metallic coating.

In another refinement, applying the metallic coating to the outer surface of the core may be carried out by a method selected from the group consisting of electroplating, electroless deposition, and electroforming These and other aspects and features of the present disclosure will be more readily understood when read in conjunction with the accompanying drawings.

It should be understood that the drawings are not necessarily drawn to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments disclosed herein.

DETAILED DESCRIPTION

Figure 1:
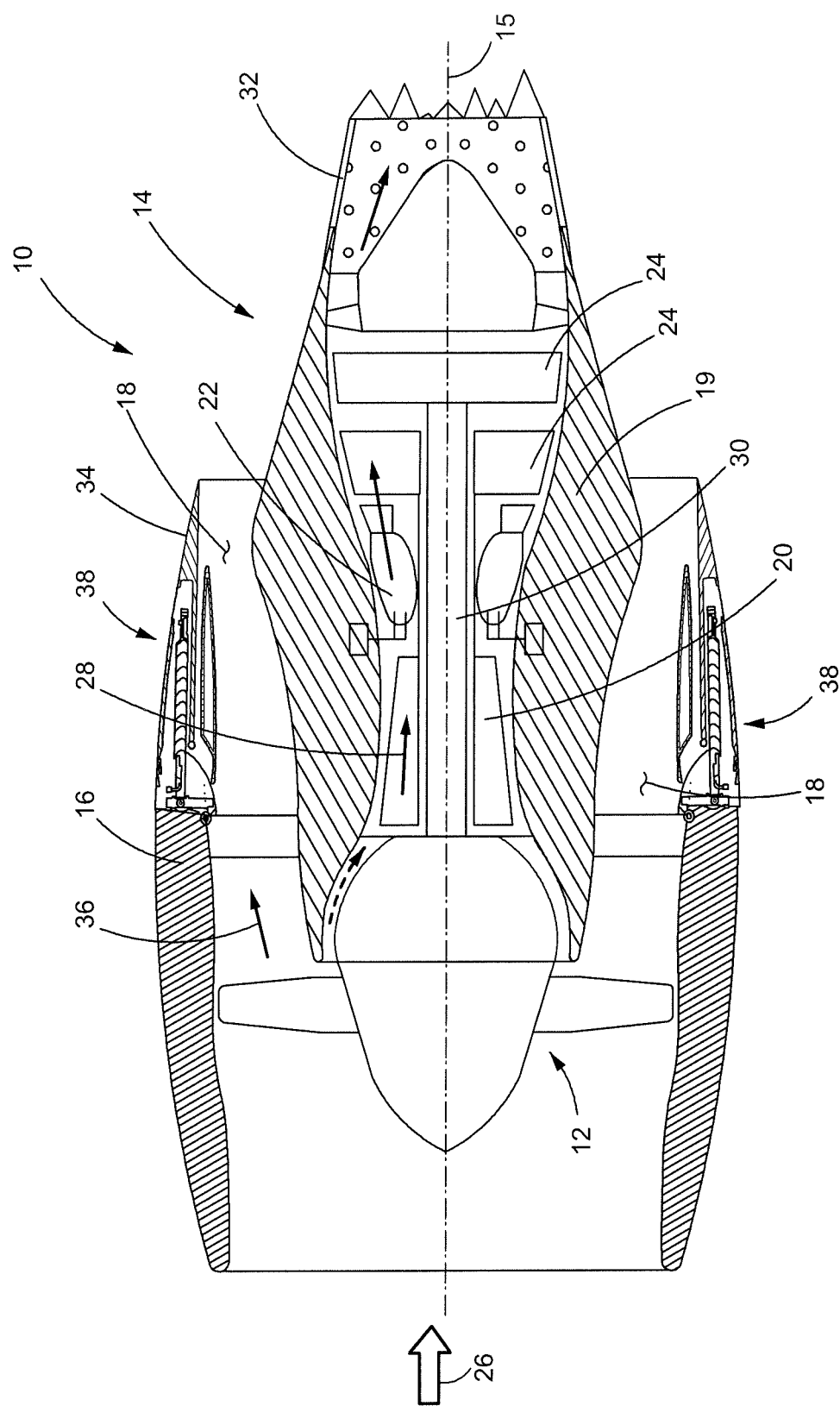
FIG. 1 is a cross-sectional view of a gas turbine engine having a nacelle with a thrust reverser in a stowed position, constructed in accordance with the present disclosure.

Referring now to the drawings, and with specific reference to FIG. 1, a gas turbine engine 10 in accordance with the present disclosure is depicted. The gas turbine engine 10 may provide power to an associated aircraft, or it may provide power for other applications. It may consist of a fan section 12 as well as a core engine 14 disposed sequentially along an engine central axis 15, as shown. A nacelle 16 may surround the fan section 12 and at least a portion of the core engine 14 to define an annular bypass duct 18 between the nacelle 16 and an engine case 19 surrounding the core engine 14. The core engine 14 may consist of a compressor section 20 (which may include a low pressure compressor and a high pressure compressor) located downstream of the fan section 12, an annular combustor 22 (although a series of circumferentially-spaced 'can' combustors may also be used) located downstream of the compressor section 20, and a turbine section 24 (which may include a high pressure turbine and a low pressure turbine) located downstream of the combustor(s) 22.

During operation, air 26 may be drawn into the gas turbine engine 10 and accelerated by the fan section 12. After passing the fan section 12, a fraction of the indrawn air may be routed through a primary flowpath 28 defined by the core engine 14. In the primary flowpath 28, the air 26 may first be compressed and pressurized in the compressor section 20, and it may then enter the combustor(s) 22 where it may be mixed with fuel and combusted to generate hot combustion gases. The hot combustion gases may then expand through and drive the rotation of the turbine section 24 which may, in turn, drive the rotation of the compressor section 20 and the fan section 12, as all may be connected on a shaft 30. The gases may then be exhausted through an exhaust nozzle 32 to provide a fraction of forward thrust to an associated aircraft. The remaining forward thrust may be provided by the air 26 that exits the annular bypass duct 18 through a nozzle 34 after passing through a bypass pathway 36 defined by the bypass duct 18.

Figure 2:
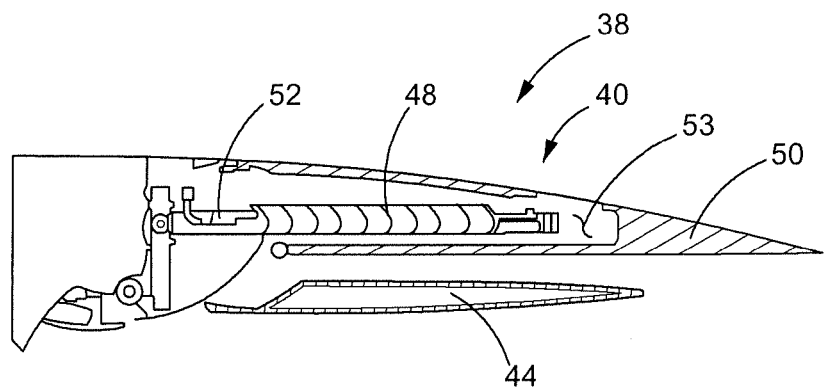
FIG. 2 is a cross-sectional view of the thrust reverser of FIG. 1 shown in isolation.
Figure 3:
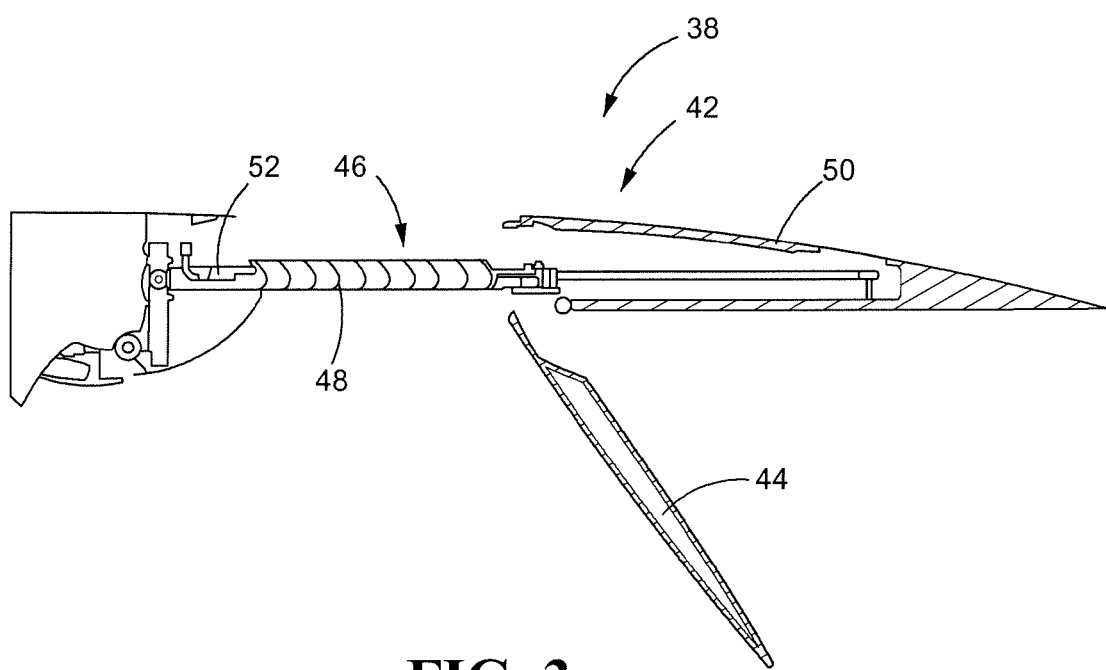
FIG. 3 is a cross-sectional view similar to FIG. 2, but showing the thrust reverser in a deployed position.

During take-off, climb, cruise, and descent, a thrust reverser 38 disposed in a downstream portion of the nacelle 16 may be in a stowed position 40 in which it may allow the air 26 to flow through the bypass pathway 36 (see FIG. 2). However, after landing, the thrust reverser 38 may be translated to a deployed position 42 to provide reverse thrust which counteracts the forward thrust and assists in slowing down the aircraft (see FIG. 3). As best shown in FIGS. 2-3, the thrust reverser 38 may generally consist of a plurality of thrust reverser cascades 46 each having a plurality of turning vanes 48. The cascades 46 may be fixed or actuated by some arrangement, and the turning vanes 48 may be fixed or moveable. The thrust reverser 38 may further include a translating sleeve 50, and one or more actuators 52 which may be capable of actuating the movement of the translating sleeve 50 between the stowed position 40 and the deployed position 42 (see below). In addition, some thrust reverser arrangements may further include one or more blocker doors 44 and the actuators 52 may actuate the movement of the blocker doors 44 between the stowed position 40 and the deployed position 42 (see further details below).

In the stowed position 40, the blocker doors 44 of the thrust reverser 38 may be oriented substantially parallel to the engine central axis 15, such that they do not interfere with the air flowing through the bypass pathway 36. In addition, the translating sleeve 50 may enclose the thrust reverser cascades 46 within a recess 53 formed in the translating sleeve 50, as shown in FIG. 2. In shifting to the deployed position 42, the actuators 52 may cause the blocker doors 44 to swing radially inwardly to at least partially obstruct airflow passing through the bypass pathway 36, while also causing the translating sleeve 50 to translate axially downstream to expose the thrust reverser cascades 46, as shown in FIG. 3. In the deployed position, at least a portion of the air 26 in the bypass duct 18 may then be forced through the thrust reverser cascades 46, causing the air 26 to be turned by the turning vanes 48 to provide the reverse thrust. However, it is noted that some thrust reverser arrangements may lack the blocker doors 44 and the shape of the bypass duct 18 may be such that at least a portion of the translating sleeve 50 blocks airflow through the bypass pathway 36 when it is in the deployed position 42, without the need for blocker doors.

Figure 4:
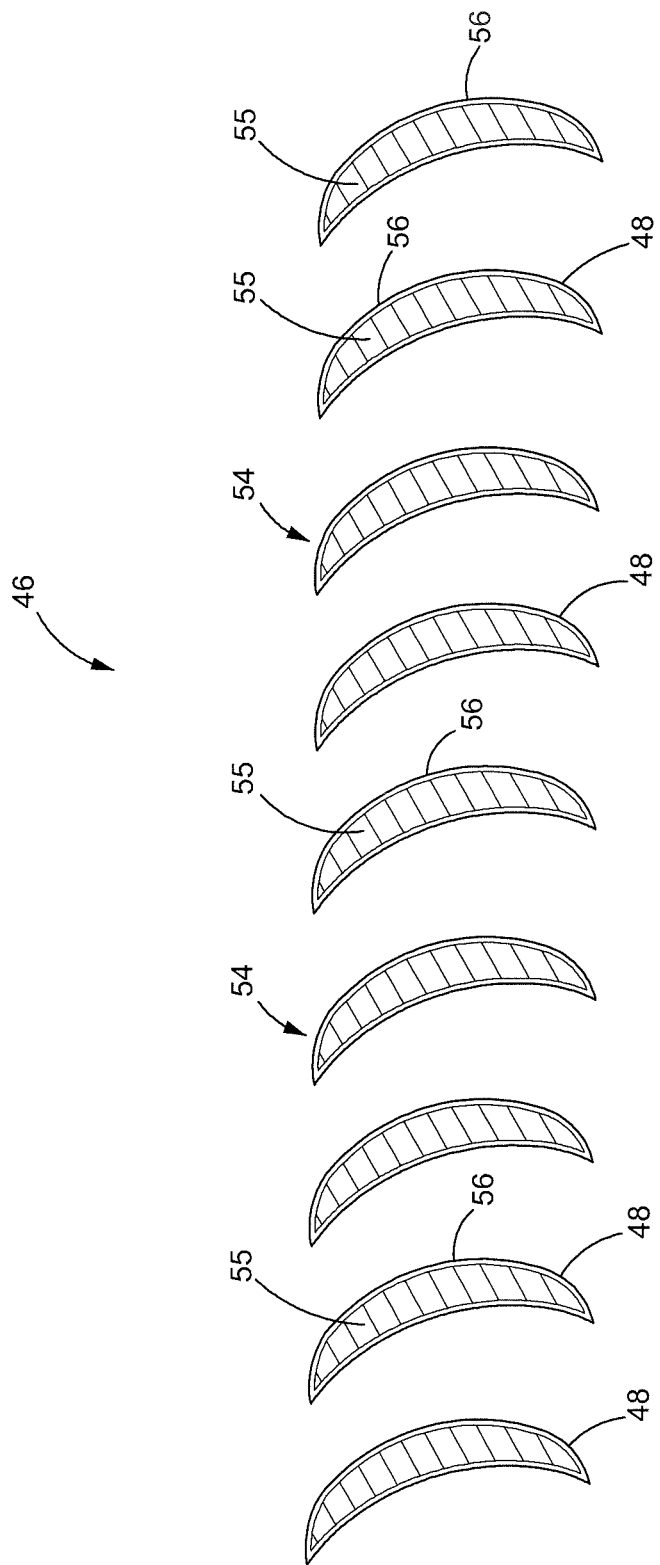
FIG. 4 is a cross-sectional view of a thrust reverser cascade of the thrust reverser of FIGS. 1-3, constructed in accordance with the present disclosure.

Turning now to FIG. 4, one or more of the turning vanes 48 of the thrust reverser cascades 46 may be constructed from a metallic-coated polymer 54. Due to their material construction, the turning vanes 48 may be lighter in weight, more durable, and less costly to produce than turning vanes manufactured by current methods. In addition, the metallic-coated polymer construction of the turning vanes 48 of the present disclosure may allow them to be fabricated in more flexible and diverse shapes than those produced by current approaches. It is contemplated that the more flexible and diverse turning vane shapes may provide increased reverse thrust, thereby allowing for shorter thrust reverser cascade lengths. Such shorter thrust reverser cascades lengths may lead to advantageous reductions in fan duct losses and external drag. In addition, the cascades 46 may have improved performance, thereby providing the aircraft with greater stopping force within the same or less volume.

The metallic-coated polymeric turning vanes 48 may have a core 55 formed from one or more polymers. In addition, at least a portion of an outer surface of the core 55 may be coated or plated with one or more metallic coatings 56. As one possibility, the entire outer surface of the core 55 may be coated with the metallic coating 56, as shown in FIG. 4. However, the metallic coating 56 may be applied to selected outer surfaces of the core 55 as well. In any event, the polymeric core 55 of the turning vanes 48 may be lightweight and readily manufactured in a variety of shapes, while the metallic coating(s) 56 may provide the turning vanes 48 with enhanced structural resilience.

The polymer(s) forming the core 55 may be formed from a thermoplastic material or a thermoset material, either of which may be optionally reinforced with one or more types of reinforcing materials such as, but not limited to, carbon fibers, glass fibers, metal fibers, aramid fibers, and combinations thereof. Suitable thermoplastic materials may include, but are not limited to, polyetherimide (PEI), thermoplastic polyimide, polyether ether ketone (PEEK), polyether ketone ketone (PEKK), polysulfone, polyamide, polyphenylene sulfide, polyester, polyimide, and combinations thereof. Suitable thermoset materials may include, but are not limited to, condensation polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones (thermoset), and combinations thereof. The metallic coating(s) 56 may consist of one or more metals such as, but not limited to, nickel, lead, cobalt, copper, iron, gold, silver, palladium, rhodium, chromium, zinc, tin, cadmium, and alloys with any of the foregoing elements comprising at least 50 wt. % of the alloy, and combinations thereof.

Figure 5:
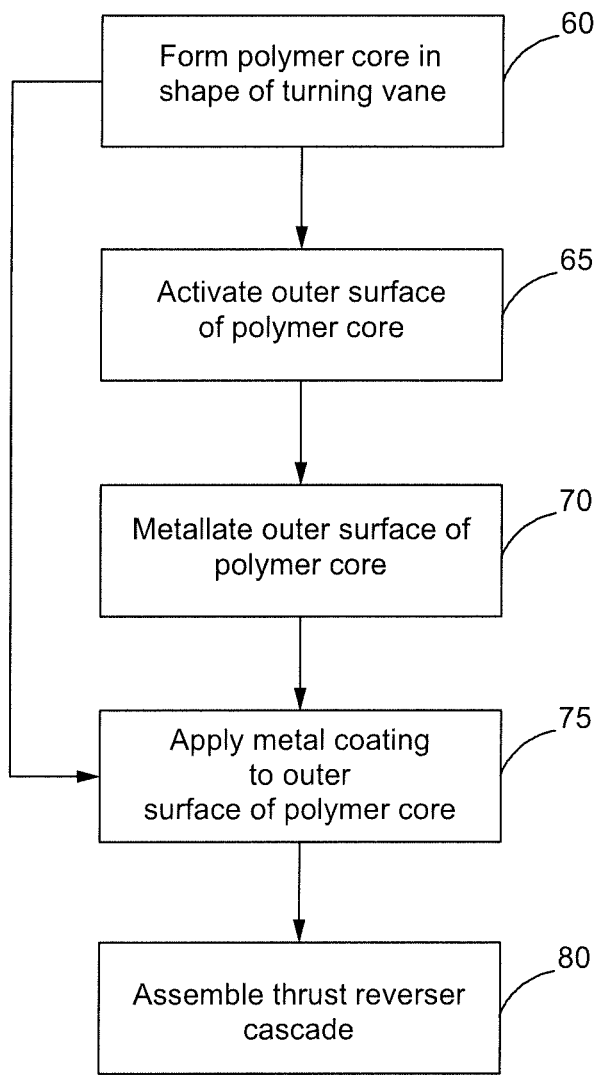
FIG. 5 is a flowchart depicting a sequence of steps which may be involved in fabricating the thrust reverser cascade, in accordance with a method of the present disclosure.

A possible method for fabricating the thrust reverser cascade 46 having one or more turning vanes 48 formed from the metallic-coated polymer 54 is depicted in FIG. 5. Beginning with a first block 60, the polymeric core 55 may be formed from selected thermoplastic or thermoset materials (with optional reinforcement) in a shape of the desired turning vane 48. Forming of the polymeric core 55 may be achieved by using a range of polymer molding processes apparent to those skilled in the art such as, but not limited to, injection molding, compression molding, blow molding, additive manufacturing (liquid bed, powder bed, deposition), or composite layup (autoclave, compression, or liquid molding). Notably, these polymer molding techniques may provide a range of complex turning vane shapes which may, in some cases, be inaccessible by current turning vane manufacturing methods.

Following the block 60, the outer surface of the core 55 may be activated with a catalyst layer according to a next block 65. The block 65 may first involve preparing the outer surface of the core 55 to receive the catalyst by surface etching, surface abrasion, ionic activation, or another suitable method, followed by deposition of a catalyst layer on the outer surface. The catalyst layer may be a palladium catalyst layer, although platinum or gold may also be used. The outer surface of the core 55 may then be metallated with one or more conductive layers according to a next block 70, as shown. The block 70 may involve electroless deposition of a first layer followed by electrolytic deposition of a second layer on the first layer. The first layer may be nickel and the second layer may be copper or another suitable conductive material, such as silver or conductive graphite. Following the deposition of the second layer, the outer surface of the core 55 may exhibit properties similar to a metal (i.e., conductivity, etc.), thereby allowing the electrolytic deposition of one or more metallic coatings thereon.

One or more metallic coating(s) 56 may then be applied to the activated/metalized outer surface of the core 55 according to a next block 75, as shown. The metallic coating(s) 56 may be applied using various metal deposition techniques apparent to those skilled in the art, such as, but not limited to, electrolytic deposition (electroplating), electroless deposition, or electroforming. As an alternative arrangement, the metallic coating(s) 56 may be directly applied to the outer surface of the core 55 (without activation/metallization of the outer surface of the core 55) after the block 60, as shown in FIG. 5. In this case, the metallic coating(s) 56 may be applied by physical vapor deposition, chemical vapor deposition, cold spraying, or another metal coating method selected by a skilled artisan. In any event, the thickness of the metallic coating(s) 56 may be adjusted as needed during the block 75 to provide the turning vanes 48 with a desired durability and strength.

Completion of the block 75 may provide a turning vane 48 having a metallic-coated polymer construction. The blocks 60, 65, 70, and 75 may be repeated as needed to provide the desired number of turning vanes 48. The turning vanes 48 may then be assembled to provide the thrust reverser cascade 46 using procedures apparent to those skilled in the art, according to a next block 80.

In general, it can therefore be seen that the technology disclosed herein may have applicability in a variety of settings including, but not limited to, gas turbine engine construction. The present disclosure introduces turning vanes formed from metallic-coated polymers for thrust reverser cascades in gas turbine engines. The metallic-coated polymeric construction of the turning vanes may offer lighter-weight, more durable, and less costly alternatives compared with currently available turning vanes for thrust reverser cascades. In addition, the metallic-coated polymeric turning vanes may be manufactured in more flexible and complex shapes than those provided by existing methods. The more flexible shapes of the turning vanes may provide increased reverse thrust ability which may allow shorter thrust reverser cascade lengths to be used. The shorter thrust reverser cascades may, in turn, provide beneficial reductions in fan duct losses and external drag. It is expected that the technology disclosed herein may find wide applicability in areas such as, but not limited to, aerospace and power generation applications.

What is claimed:

1. A thrust reverser cascade for a gas turbine engine, comprising:
   a plurality of turning vanes, at least one of the plurality of turning vanes comprising
      a core formed from at least one polymer, and
      at least one metallic coating applied to at least a portion of an outer surface of the core wherein the at least one metallic coating is formed from a metallic material selected from the group consisting of nickel, chromium, zinc, cadmium, alloys with any of the foregoing elements comprising at least 50 wt% of the foregoing element, and combinations thereof.

2. The thrust reverser cascade of claim 1, wherein the at least one metallic coating comprises nickel.

3. The thrust reverser cascade of claim 1, wherein the at least one metallic coating is formed from a metallic material selected from the group consisting of nickel and nickel alloys.

4. The thrust reverser cascade of claim 1, wherein the at least one polymer is a thermoplastic material selected from the group consisting of polyetherimide, thermoplastic polyimide, polyether ether ketone, polyether ketone ketone, polysulfone, polyamide, polyphenylene sulfide, polyester, polyimide, and combinations thereof.

5. The thrust reverser cascade of claim 1, wherein the at least one polymer is a thermoset material selected from the group consisting of polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones, and combinations thereof.

6. The thrust reverser cascade of claim 1, wherein the core further comprises at least one reinforcing material selected from the group consisting of carbon fibers, glass fibers, aramid fibers, metal fibers, and combinations thereof.

7. The thrust reverser cascade of claim 1, wherein the at least one metallic coating is applied to the outer surface of the core by a method selected from the group consisting of electroplating, electroless deposition, and electroforming.

8. The thrust reverser cascade of claim 1, wherein the thrust reverser cascade is incorporated in a thrust reverser disposed in a nacelle of the gas turbine engine, the thrust reverser comprising a translating sleeve, and at least one actuator capable of actuating movement of the translating sleeve between a stowed position and a deployed position.

9. A gas turbine engine, comprising:
   a fan section;
   a core engine located downstream of the fan section, the core engine comprising
      a compressor section,
      a combustor located downstream of the compressor section, and
      a turbine section located downstream of the combustor;
   a nacelle surrounding the fan section and the core engine and defining a bypass duct between the nacelle and the core engine; and
   a thrust reverser disposed in the nacelle comprising
      a translating sleeve,
      at least one actuator capable of actuating movement of the translating sleeve between a stowed position and a deployed position, and
      at least one thrust reverser cascade comprising a plurality of turning vanes, at least one of the plurality of turning vanes comprising a core formed from at least one polymer and at least one metallic coating applied to at least a portion of an outer surface of the core wherein the at least one metallic coating is formed from a metallic material selected from the group consisting of nickel, nickel alloys, lead, cobalt, copper, silver, iron, gold, palladium, rhodium, chromium, zinc, cadmium, alloys with any of the foregoing elements comprising at least 50 wt% of the foregoing element, and combinations thereof.

10. The gas turbine engine of claim 9, wherein the thrust reverser further comprises at least one blocker door, and the at least one actuator is capable of actuating the movement of the at least one blocker door between a stowed position and a deployed position.

11. The gas turbine engine of claim 9, wherein the at least one metallic coating comprises nickel.

12. The gas turbine engine of claim 9, wherein the at least one polymer is a thermoplastic material selected from the group consisting of polyetherimide, thermoplastic polyamide, polyether ether ketone, polyether ketone ketone, polysulfone, polyamide, polyphenylene sulfide, polyester, polyimide, and combinations thereof.

13. The gas turbine engine of claim 9, wherein the at least one polymer is a thermoset material selected from the group consisting of condensation polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones, and combinations thereof.

14. The gas turbine engine of claim 9, wherein the core further comprises at least one reinforcing material selected from the group consisting of carbon fibers, glass fibers, aramid fibers, metal fibers, and combinations thereof.

15. A method for fabricating a thrust reverser cascade for a gas turbine engine, comprising:
   forming a core in a shape of a turning vane from at least one polymer;
   applying a metallic coating to an outer surface of the core to provide a metallic-coated polymeric turning vane wherein the metallic coating is formed from a metallic material selected from the group consisting of nickel, nickel alloys, lead, cobalt, copper, silver, iron, gold, palladium, rhodium, chromium, zinc, cadmium, alloys with any of the foregoing elements comprising at least 50 wt% of the foregoing element, and combinations thereof; and assembling the thrust reverser cascade from a plurality of turning vanes, at least one of the plurality of turning vanes being the metallic-coated polymeric turning vane.

16. The method according to claim 15, wherein forming the polymer in the shape of the turning vane is performed using a method selected from the group consisting of injection molding, compression molding, blow molding, additive manufacturing, and composite layup.

17. The method according to claim 15, further comprising activating the outer surface with a catalyst layer followed by metallizing the outer surface with a conductive layer, prior to applying the metallic coating.

18. The method according to claim 17, wherein applying the metallic coating to the outer surface is carried out by a method selected from the group consisting of electroplating, electroless deposition, and electroforming.

\* \* \* \* \*